US007786627B2

(12) United States Patent
Riedl

(10) Patent No.: US 7,786,627 B2
(45) Date of Patent: Aug. 31, 2010

(54) ELECTRICAL HAND-HELD POWER TOOL WITH COOLING OF ELECTRONICS

(75) Inventor: Reinhard Riedl, Finning (DE)

(73) Assignee: Hilti Aktiengesellschaft, Schaan (LI)

( * ) Notice: Subject to any disclaimer, the term of this patent is extended or adjusted under 35 U.S.C. 154(b) by 100 days.

(21) Appl. No.: 12/154,469

(22) Filed: May 22, 2008

(65) Prior Publication Data

US 2008/0290745 A1 Nov. 27, 2008

(30) Foreign Application Priority Data

May 24, 2007 (DE) ...................... 10 2007 000 290

(51) Int. Cl.
*B23Q 11/10* (2006.01)

(52) U.S. Cl. ..................................... 310/50; 310/60 R

(58) Field of Classification Search ............... 310/60 R, 310/50, 51.52, 54, 60 A, 62, 64
See application file for complete search history.

(56) References Cited

U.S. PATENT DOCUMENTS 6,543,549 B1 * 4/2003 Riedl et al. ................. 173/216
6,776,245 B2 * 8/2004 Kristen et al. ............... 173/217
6,866,105 B2 * 3/2005 Pfisterer et al. ............. 173/117
7,256,520 B2 * 8/2007 Braun et al. .................. 310/50
7,270,910 B2 * 9/2007 Yahnker et al. ............... 429/62
7,308,950 B2 * 12/2007 Faatz et al. ................. 173/217
7,354,226 B2 * 4/2008 Britz ........................... 408/67
2001/0052419 A1 * 12/2001 Quirijnen et al. ............ 173/217
2004/0027010 A1 * 2/2004 Oomori et al. ................ 310/50

* cited by examiner

*Primary Examiner*—Quyen Leung
*Assistant Examiner*—Naishadh N Desai
(74) *Attorney, Agent, or Firm*—Abelman, Frayne & Schwab

(57) ABSTRACT

An electrical hand-held power tool includes a drive motor, a ventilation device (10) for generating an air flow (L) along a main flow path (26) for cooling the drive motor (8), and an electronic device (22) for controlling operation of the drive motor (8) all of which are located in the housing (4), and a plurality of air conducting elements (30) that project from an inner wall (32) of the housing for limiting an auxiliary flow path (36) through which at least a portion of the air flow (L) is forwarded to the electronic device (22), with the air conducting elements (30) forming an auxiliary path inlet (40) of the auxiliary flow path (36) and which projects between a main path inlet (24) of the housing (4) and the ventilation device (10) into the main flow path (26), so that the auxiliary path inlet (40) is walled off from the ventilation device (10).

5 Claims, 2 Drawing Sheets

ELECTRICAL HAND-HELD POWER TOOL WITH COOLING OF ELECTRONICS

BACKGROUND OF THE INVENTION

1. Field of the Invention

The present invention relates to an electrical hand-held power tool including a drive motor located in the power tool housing, and a ventilation device also located in the housing. The ventilation device generates an air flow along a main flow path for cooling the drive motor. An electronic device, which is located in the housing, controls operation of the drive motor. A plurality of air conducting elements that project from the inner surface of the housing limits an auxiliary flow path through which at least a portion of the air flow is forwarded to the electronic device.

2. Description of the Prior Art

In the power tools described above, the available motor cooling can be used to simultaneously cool the electronic device. With such electronics cooling, heating of the electronic device to a certain value, at which damage of the electronics or incorrect control of the supply current takes place, can be prevented.

German Publication 10 2005 007 545 A1 discloses a device for cooling of control electronics of a hand-held power tool. The device has a fan wheel that produces an air flow that is aspirated through a housing opening and is directed past the drive motor to the fan wheel.

Radially adjacent to the fan wheel, an air guiding arrangement is provided into which at least a portion of the air flow, which is deflected by the fan wheel, is injected. The air guiding arrangement is formed by two air conducting plates that form a flow path toward the electronics cooling plate of the control electronics.

The drawback of the known device consists in that because of the pressurized nature of the air guiding arrangement, at least its inlet opening must be located adjacent to the fan wheel in the radial direction of the fan wheel in order to be able to direct the air flow into the flow path. However, this significantly limits the possibility of arrangement of the auxiliary flow path and also of the electronic device.

Accordingly, an object of the present invention is to eliminate the above-mentioned drawbacks in an electrical hand-held power tool and to provide for as free as possible positioning of the auxiliary flow path while insuring an adequate cooling of the electronic device.

SUMMARY OF THE INVENTION

These and other objects of the present invention, which will become apparent hereinafter, are achieved by providing air conducting elements forming an auxiliary path inlet of the auxiliary flow path and which extends between a main path inlet of the housing and the ventilation device into the main flow path, so that the auxiliary path inlet is walled off from the ventilation device.

With the foregoing arrangement of the auxiliary path inlet, it is located on the suction side of the ventilation device and opens into the main flow path opposite the air flow which is produced during operation of the power tool. The auxiliary path inlet can have an arbitrary selected cross-sectional surface extending perpendicular or at an angle to the flow direction in the main flow path. In each case, a portion of the air flow enters the auxiliary flow path from the main flow path and flows through the auxiliary flow path to the to-be-cooled electronic device. Thus, the position of the auxiliary path inlet and of the air conducting elements can be arbitrarily selected along the suction side of the main flow path which results in a large freedom of selection of the position of the electronic device itself.

According to a particular advantageous embodiment of the present invention, the tool housing has a drive motor housing part in which the drive motor is located, and a handle housing part extending away from the drive housing part, and the air conducting elements extend along the handle housing part. Thereby, cooling of an electronic device, which is located outside of the drive motor housing, can be carried out.

Advantageously, the electronic device is located in an end section of the handle housing part remote from the drive motor housing part, and the air conducting elements form, at an electronic device side end of the auxiliary flow path remote from the auxiliary path inlet, an auxiliary path outlet facing in a direction of an electronic device cooling plate. Thereby, an effective cooling of an electronic device can be insured, with the electronic device being arranged directly on an accumulator interface or on a distribution plate connected with the feeding cable.

Advantageously, the air conducting elements have a side opening that provides for cooling of a motor switch, which is located in the handle housing part, by the air flow that passes through the auxiliary flow path. Thereby, in addition to the cooling of the drive motor and the electronic device, the switch is also cooled.

Advantageously, the motor switch has a switch cooling plate that at least partially extends into the side opening. The switch cooling sheet insures also an adequate cooling of the regions of the switch spaced by a large distance from the auxiliary flow path.

It is particularly advantageous when the switch cooling plate limits the auxiliary flow path flush with the air conducting elements. Thereby, on one hand, an undesirable flow resistance is prevented and, on the other hand, the switch cooling plate can be used simultaneously as an air conducting element.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
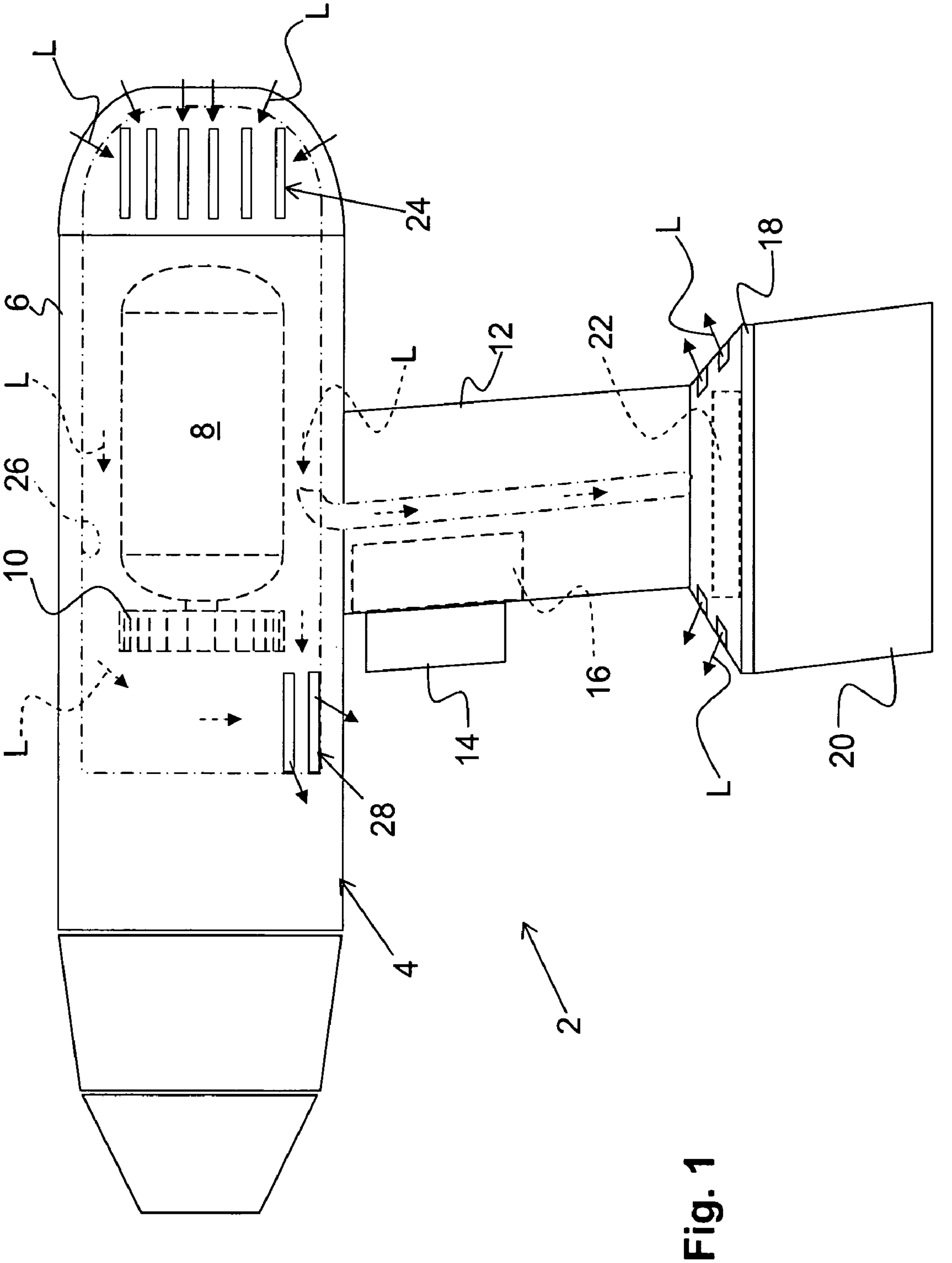
FIG. 1 a side view of a hand-held power tool.

A electrical hand-held power tool 2, which is shown in FIG. 1 and is formed, e.g., as a screwdriving tool with the use of accumulator(s) as a power source, includes a housing 4 having a drive housing part 6 in which a drive motor 8 with a ventilation device 10 are received, and a handle housing part 12 on which a switch rawl 14 for actuation a motor switch 16, which is located in the handle housing part 12, is provided. Further, an end section 17 of the handle housing part 12 remote from the drive housing part 6, is provided with an interface 18 for mounting an accumulator package 20. An electronic device 22, which controls the drive motor 8 in a manner not shown in the drawings, is arranged on the interface 18. Alternatively, the hand-held power tool 2 can be formed as a network-powered power tool, with the electronic device 22 being arranged, in this case, e.g., on a distribution plate connected with the feeding cable.

Figure 2:
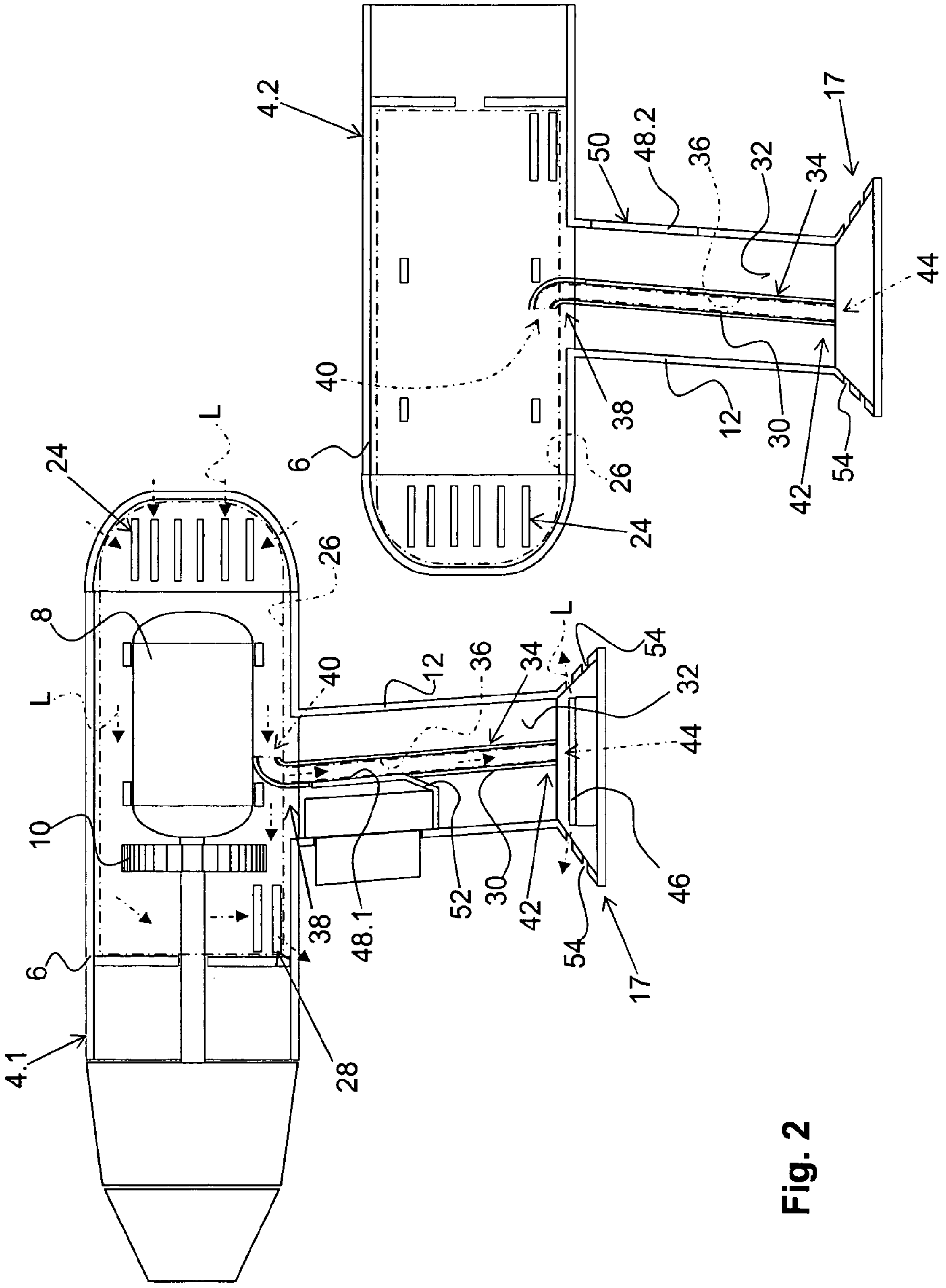
FIG. 2 a side view of the housing of the power tool according to FIG. 1 with separated from each other, housing shells and removed accumulator package.

As can be seen in FIGS. 1-2, during the operation of the hand-held power tool 2, the rotation of the ventilation device 10 produces an air flow for cooling the drive motor 8, which is shown with arrows L. The air flows into the housing 4 through a plurality of housing slots that function as a main path entrance 24, and flows through a main flow path 26, which is limited by the drive housing part 6, to the ventilation device 10 that expels the air stream L again outwardly through a main path outlet 28 likewise formed by slots provided in the housing 4.

As shown in FIG. 2, the housing 4 is formed of a first shell 4.1 and a second shell 4.2 which are sidewise connected with each other and form, respectively, the drive housing part 6 and the handle housing part 12.

On both shells 4.1 and 4.2, air distribution elements 30 are provided and which respectively, project from an inner surface 32 of a respective shell 4.1 or 4.2 and which extend essentially along the handle housing part 12. The air distribution elements 30 form, in the assembled condition of the shells 4.1, 4.2, together a channel 34 that limits an auxiliary flow path 36. At the drive side end 38 of the channel 34, the air distribution elements 30 form an auxiliary path inlet 40. The auxiliary path inlet 40 extends into the main flow path 26 and is bent away from the ventilation device 10 or is bent in the direction of the main path inlet 24. The auxiliary path inlet 40 has a free cross-section that extends transverse to or is inclined to the air flow L generated during operation.

At the electronic device-side end 42 of the channel 34, the air distribution elements 30 form, in the assembled condition of the shells 4.1, 4.2, an auxiliary path outlet 44 directed toward an electronics cooling plate 46 of the electronic device 22.

On both shells 4.1, 4.2, the air distribution elements 30 are provided with respective openings 48.1, 48.2 which together form a side opening 50 of the channel 34 into which a switch cooling plate 52 of the motor switch 16 projects. The switch cooling plate 52 is so arranged that it forms a short connection with the air distribution elements 30 and, thereby, itself serves for conducting air flow L along the auxiliary flow path 36.

Thus, during the operation of the power tool 2, the ventilation device 10 rotates upon actuation of the drive motor 8 and produces an air flow L along the main flow path 26 from the main path inlet 24 toward the ventilation device 10. A portion of the air flow L enters in the channel 34 through the auxiliary path inlet 40 where it then is deflected at the drive side end 38 of the auxiliary flow path 36 and is then guided in the direction of the electronic device 22. The air flow passes past the switch cooling plate 52 located in the side opening 50, effecting cooling of the same.

Then, the air flow L exits at the electronics-side end 42 from the auxiliary flow path 36 and impacts the electronics cooling plate 46, thereby cooling the same. Finally, the air flow L, which flows through the auxiliary flow path 36 exits again from the housing 4 through the handle housing outlet 54 which can be formed, e.g., by one or more slots provided in the end section 17.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. An electrical hand-held power tool, comprising:

a drive motor (8);

an electronic device (22) for controlling operation of the drive motor (8);

a housing (4) having a drive motor housing part (6) in which the drive motor is located and which has entrance slots (24) and exit slots (28), and a handle housing part (12) extending away form the drive motor housing part (6) and in which the electronic device (22) is located;

a ventilation device (10) located in the motor housing part (6) between the entrance slots (24) and the outlet slots (28) for generating an air flow (L) along a main flow path (26) inside the motor housing part (6) between the entrance slots (24) and the outlet slots (28);

air conducting elements (30) extending along the handle housing part (12) and forming a channel (34) defining an auxiliary flow path (36), the auxiliary flow path-defining channel (34) extending into the drive motor housing part (6) and projecting into the main flow path (26), and a portion of channel (34) located in drive motor housing part (6) being curved such that an opening of the channel (34) faces toward the entrance slots (26) and away from the ventilation device (10).

2. An electric hand-held power tool according to claim 1, wherein the channel opening defines an auxiliary flow path inlet (40, and the air conducting element (30) form, at an electronic device-side end (42) of the auxiliary flow path (36) remote from the auxiliary path inlet (40), an auxiliary path outlet (44) facing in a direction of an electronic device cooling plate (46).

3. An electrical hand-held power tool according to claim 2, wherein the air conducting elements (30) have a side opening (50) that provides for cooling of a motor switch (16), which is located in the handle housing part (12), by the air flow (L).

4. An electrical hand-held power tool according to claim 3, wherein the motor switch (16) has a switch cooling plate (52) that at least partially extends into the side opening (50).

5. An electrical hand-held power tool according to claim 3, wherein the switch cooling plate (52) limits the auxiliary flow path (36) flush, with the air conducting elements.

* * * * *